US006955358B2

(12) United States Patent
Iwakata et al.

(10) Patent No.: US 6,955,358 B2
(45) Date of Patent: Oct. 18, 2005

(54) OIL SEAL

(75) Inventors: Keisaku Iwakata, Oyama (JP); Kenji Mihara, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/821,475

(22) Filed: Apr. 8, 2004

(65) Prior Publication Data

US 2004/0201179 A1 Oct. 14, 2004

(30) Foreign Application Priority Data

Apr. 11, 2003 (JP) ....................................... 2003-107639

(51) Int. Cl.[7] ................................................ F16J 15/32

(52) U.S. Cl. ........................ 277/549; 277/571; 277/572

(58) Field of Search ................................ 277/549, 571, 277/572

(56) References Cited

U.S. PATENT DOCUMENTS 5,655,781 A * 8/1997 Petrak ........................ 277/371

FOREIGN PATENT DOCUMENTS

JP 8-14399 A 1/1996
JP 2002-250449 A 9/2002

* cited by examiner

*Primary Examiner*—Enoch Peavey

(74) *Attorney, Agent, or Firm*—Frishauf, Holtz, Goodman & Chick, P.C.

(57) ABSTRACT

An oil seal (10) includes a first seal (20) for sealing an engine (1) side and a second seal (30) for sealing a flywheel (4) side. The first seal (20) is an axial seal abutted on an inner ring (11) from the direction along the axial direction of a crank shaft (2). The second seal (30) is a radial seal abutted on the inner ring (11) from the direction along the radial direction of the crank shaft (2). A communication hole (25) is provided on the second seal (30), thereby preventing a space (40) surrounded by the first seal (20), the second seal (30) and the inner ring (11) from the occurrence of the negative pressure.

16 Claims, 3 Drawing Sheets

OIL SEAL

BACKGROUND OF THE INVENTION

1. Field of the Invention

The present invention relates to an oil seal, and in particular to a two-liquid-sealing oil seal in which liquid present on both sides of the oil seal are sealed.

2. Description of Related Art

Conventionally known oil seals include a one-liquid-sealing oil seal having a single lip for preventing lubrication oil around a rotary shaft from leaking from one side to the other side of the oil seal, and a two-liquid-sealing oil seal having lips provided on both sides of the oil seal for preventing lubrication oils present on both sides from leaking from one side to the other side or vise versa. The two-liquid-sealing oil seal is provided, for example, between the outer circumference of a crank shaft of an engine and the inner circumference of a flywheel housing in order to seal engine oil fed on the crank shaft and lubrication oil fed on a clutch disc on the flywheel side or a transmission.

The two-liquid-sealing oil seal includes an axial seal in which a lip is abutted on a circular metal ring fixed on the outer circumference of the rotary shaft to seal lubrication oil (for instance, see JP2002-250449A, on page 3 and FIG. 1). The metal ring with a substantially L-shaped cross section includes a cylinder fixed on the outer circumference of the rotary shaft and a flange continuously extending outward in the radial direction of the rotary shaft from the cylinder. The lubrication oil at one side is sealed by the axial seal lip abutted on the flange of the metal ring form the axial direction. Further, the lubrication oil at the other side is sealed by a radial seal lip abutted on the cylinder from the radial direction.

The above oil seal spatters the lubrication oil adhered on the metal ring by the centrifugal force due to the rotation of the metal ring with the rotary shaft. When the lubrication oil enters over the flange of the metal ring, the axial seal lip prevents further invasion of the lubrication oil. Since the almost all of the lubrication oil can be prevented form entering by the centrifugal force of the metal ring, the surface pressure of the axial seal lip against the metal ring can be set low. The axial seal prevents extraordinary abrasion at the high-rotation whereas is effective while the rotary shaft rotating at high speeds, and accordingly, the improvement of durability is desired.

Incidentally, as the material of the oil seal, a fluorocarbon rubber, a silicone rubber, a nitric rubber or the like is used. However, since the oil seal is used making contact with a rotary shaft, it is likely to wear on account of a use condition including a rotational speed and a temperature, and accordingly, the development of a material which is excellent in wear-resistance is desired. Particularly, since the radial seal lip abutted from the radial direction of the rotary shaft needs the surface pressure in some measure against the rotary shaft for preferably sealing around the rotary shaft, it is likely to wear with use for a long time. Accordingly, the improvement of durability and the long-lasting sealability have been desired.

SUMMARY OF THE INVENTION

An object of the present invention is to provide a two-liquid-sealing oil seal that can improve sealability and durability.

An oil seal according to an aspect of the present invention provided on an outer circumference of a rotary shaft for sealing a first liquid and a second liquid, includes: a ring fixed on the outer circumference of the rotary shaft and provided with a flange projecting outward substantially in the radial direction of the rotary shaft; a first seal abutted on the flange from a direction substantially along the axial direction of the rotary shaft for sealing a side on which the first liquid is provided; and a second seal made of fluorocarbon resin for sealing a side on which the second liquid is provided from a direction substantially along the radial direction of the rotary shaft.

With this configuration, the ring fixed on the rotary shaft spatters the first liquid adhered on the ring by the centrifugal force due to the rotation of the ring with the rotary shaft. When the first oil enters over the ring, the first seal seals the first liquid. Thus, the first liquid is reliably sealed by the ring and the first seal. With this configuration, since the first seal is an axial for sealing the flange from the direction substantially along the axial direction of the rotary shaft, the flange spatters almost all of the engine oil adhered on the oil seal, thereby, reducing the surface pressure of the first seal against the flange. Accordingly, the durability of the first seal is improved.

On the other hand, since the second seal is a radial seal for sealing the second liquid from a direction substantially along the radial direction of the rotary shaft, the second liquid is reliably sealed by the second seal when the rotary shaft rotating. Since the second seal is made of fluorocarbon resin, a sufficient wear-resistance and a reliable sealability can be secured and even when the second seal requires for the surface pressure in some measure.

Accordingly, the oil seal constituted by the first seal and the second seal provide the reliable sealability and the durability for a long time.

Note that, the second seal abutted from the direction substantially along the radial direction of the rotary shaft may include the one directly abutted on the rotary shaft or the one abutted on a member integrally formed on a ring or another rotary shaft so as to indirectly seal the rotary shaft.

In the above oil seal according to the present invention, the second seal may preferably be made of a plate-shaped Polytetrafluoroethylene.

With this configuration, since the second seal is formed in a plate shape, the second seal has a flexibility in some measure so as to closely contact with a surface to be abutted, thereby improving the sealability. At this time, if the plate-shaped second seal, for instance, is curved to abut on the surface to be abutted while providing a biasing force, an appropriate surface pressure is secured against the rotary shaft, thereby further improving the sealability. Additionally, even when the second seal is worn in some measure, since the second seal is abutted on the surface to be abutted with the biasing force, the long-lasting sealability can be secured.

Further, since the second seal is made of Polytetrafluoroethylene, excellent characteristics can be provided such as the heat-resistance, the low-temperature resistance, the low friction coefficient and the unabsorbent characteristic. Accordingly, the second seal smoothly slides on the rotary shaft against its rotation so as to reduce heating and wearing, thereby improving the durability. Due to the unabsorbent characteristic, even when the second seal is used for a long time, the second seal does not absorb the second liquid, thereby reliably preventing the deterioration. Further, due to the low-temperature resistance of the second seal, the plate-shaped second seal has the reliable flexibility even when the second seal is used with low-temperature, thereby securing a proper biasing force and a surface pressure against the surface to be abutted so as to secure the reliable sealability.

According to the above characteristics, even when the rotary shaft rotates at high speeds, the reliable sealability and the durability can be secured while preventing overheating and wearing, thereby expanding the versatility of the oil seal.

In the above oil seal according to the present invention, at least one communication hole communicating between the inside and the outside of a space surrounded by the first seal, the second seal and the ring may preferably be formed on the first seal and/or the second seal.

According to a conventional oil seal without a communication hole, since a first seal seals a first liquid around a rotary shaft on one side of the oil seal whereas a second seal seals a second liquid on another side of the oil seal, a sealed space is defined by a space surrounded by the first seal, the second seal and the ring. In general use, when liquid enters into the sealed area, the first seal or the second seal discharge the liquid to the outside of the sealed space. Further, the air is sucked into the sealed space though the gap between the first seal or the second seal and a surface to be abutted, thereby preventing the sealed space from the occurrence of the negative pressure.

However, when the oil seal is used under the condition that the oil seal is often exposed to the liquid, the gap between the first seal or the second seal and the surface to be abutted is always filled with the liquid, so that the air cannot be sucked though the gap. In such occasion, since the negative pressure is occurred in the sealed space and the pressurizing force of the first seal and the second seal against the surface to be abutted becomes too large, the durability may not be improved due to the occurrence of the extraordinary abrasion.

With such configuration, since at least one communication hole on the first seal and/or the second seal is provided, even when the oil seal is used under the condition that the oil seal is often exposed to the liquid, the air is sucked through the communication hole so as to prevent the sealed space from the occurrence of the negative pressure. Therefore, the first seal and the second seal are prevented form the extraordinary abrasion so as to further improve the durability.

Note that the second seal indirectly seals the rotary shaft by being abutted on the ring, a space would be defined by a part surrounded by the first seal, the second seal and the ring. Alternatively, when the second seal is directly abutted on the rotary shaft, a space would be defined by a part substantially surrounded by the first seal, the second seal and the ring.

In the oil seal according to the present invention, the communication hole may preferably be formed on a lower side in the gravitation direction relative to the center of the rotary shaft.

When the liquid is sucked through the communication hole under the condition that the oil seal is often exposed to the liquid, the liquid flows to the lower side in the gravitation direction relative to the center of the rotary shaft by falling down the inside of the first seal, and is discharged from the lower end of the first seal.

With this configuration, since the communication hole is formed on the lower side in the gravitation direction relative to the center of the rotary shaft, the distance to the bottom end of the first seal becomes short, therefore the liquid entered through the communication hole is likely to reach the bottom end of the first seal. Accordingly, the amount of the liquid falling down the inside of the first seal is restricted at the minimum, thereby enhancing the drainage.

In the above oil seal according to the present invention, the oil seal may preferably be provided on the outer circumference of a crank shaft as the rotary shaft, and capable of sealing the first liquid on a side of an engine to which the crank shaft is connected, and the second liquid on a side of a flywheel attached to the crank shaft.

Engine oil presents on the side of the engine, and lubrication oil presents on the side of the flywheel. With this configuration, since the oil seal reliably seals the two liquids for a long time, the oil seal is preferable to be used for the engine rotating at high speeds with the two liquids on both sides of the rotary shaft.

At this time, since the first seal seals the engine oil on the side of the engine against a larger amount of the liquid adhered on the oil seal compared to the lubrication oil on the side of the flywheel, the ring can spatter almost all of the engine oil, thereby further ensuring the sealing. Though the second seal is arranged on the side of the flywheel to which a relatively small amount of the liquid is adhered on the oil seal, if the second seal is made of PTFE, the second seal smoothly slides on the rotary shaft even when no lubrication oil is provided on the slide surface between the second seal and the surface to be abutted, thereby securing the reliable sealability and the durability.

DETAILED DESCRIPTION OF PREFERRED EMBODIMENT(S)

An embodiment of the present invention will be described below with reference to attached drawings.

Figure 1:
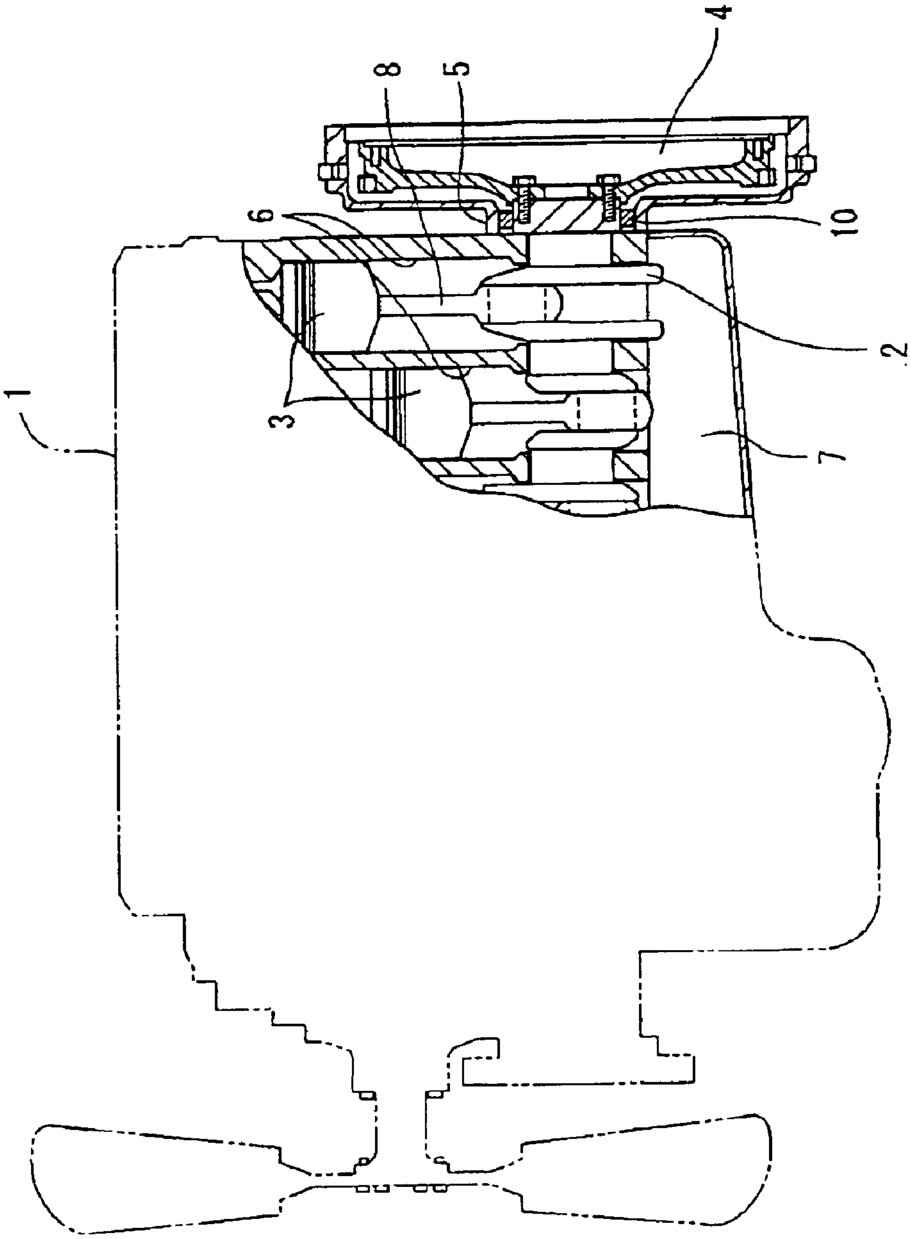
FIG. 1 is a partly sectioned view illustrating an engine according to an embodiment of the present invention.

FIG. 1 is a partly sectioned view showing an engine 1 according to this embodiment.

In FIG. 1, the engine 1 incorporates a plurality of cylinders 6 formed therein, a plurality of pistons 3 which receive a pressure of combustion gas in the respective cylinders 6 so as to reciprocate therein, a crank shaft (rotary shaft) 2 for converting the reciprocating motion of the pistons 3 into a rotary motion. Each piston 3 is coupled to the crank shaft 2 mutually arranged in parallel through the intermediary of connecting rods 8, respectively, so as to be reciprocatable.

Engine oil as lubrication oil is fed to slide parts between the cylinders 6 and the pistons 3 and between the pistons 3 and the crank shaft 2. The engine oil is reserved in an oil pan 7 provided in the lower part of the engine, and is sucked up by an oil pump (not shown) or the like. Thereafter, the engine oil is fed into the cylinders 6, to the pistons 3 and to the crank shaft 2, and then is returned to the oil pan 7 under the gravitation.

A disc-like flywheel 4 is provided at one end of the crank shaft 2 so as to restrain rotational variation thereof caused by the pistons 3, thereby obtaining smooth rotation. Further, a transmission (not shown) for transmitting a torque to a drive axle is coupled to the flywheel 4 on the side remote from the crank shaft 2 coupled thereto. The flywheel 4 has at its outer circumference a gear adapted to be engaged with a pinion of a starter, and further, the transmission has several gears meshed with each other for carrying out power transmission. Thus, it is required to properly lubricate them. Accordingly, lubrication oil different from the engine oil is fed to them, and therefore, the flywheel 4 and the transmission are driven in the atmosphere of this lubrication oil for lubrication thereof.

As stated above, different lubrication oils are used on the engine 1 side and the flywheel 4 side, respectively, the crank shaft 2 is provided thereto with a two-liquid-sealing oil seal 10 for preventing lubrication oil on the engine 1 side and lubrication oil on the flywheel 4 side from entering into one to the other of these sides. This oil seal 10 is fixed, being fitted between the outer circumference of the crank shaft 2 and the inner circumference of a housing 5.

It is noted that there are used engine oil on the engine 1 side and lubrication oil on the flywheel 4 side, which have substantially same components. Even in this case, the engine oil is used usually at a high temperature, and therefore, it deteriorates due to aging effect. Thus, it has to be frequently exchanged, in comparison with the lubrication oil on the flywheel 4 side, and accordingly, it is required that they are isolated from each other by means of the oil seal 10. Thus, the oil seal 10 in this embodiment is a two-liquid-sealing oil seal for serving the engine oil on the engine 1 side as a first liquid and the lubrication oil on the flywheel 4 side as a second liquid.

Figure 2:
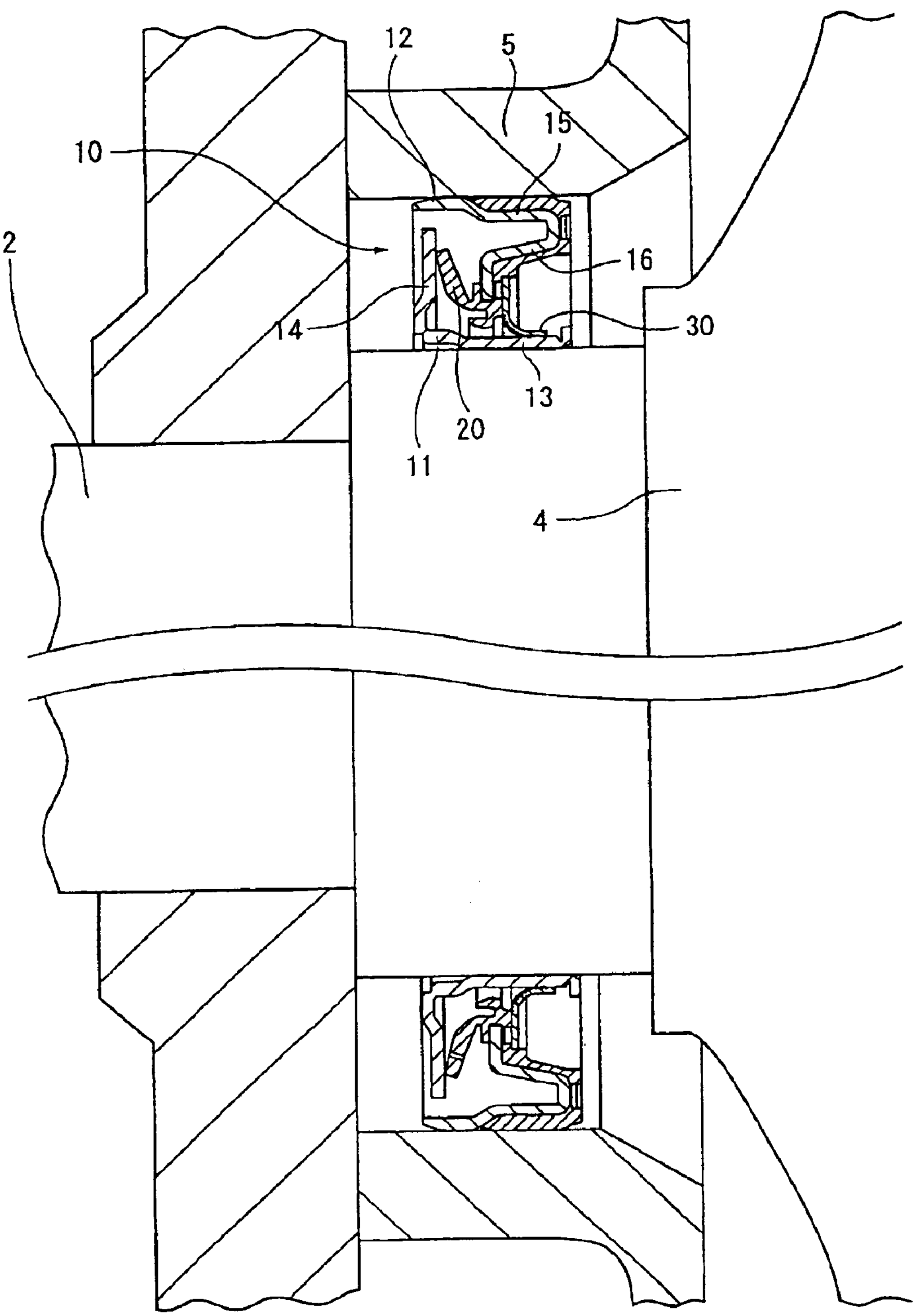
FIG. 2 is a fragmentary sectional view showing an oil seal according to the embodiment of the present invention.

As shown in FIG. 2, the oil seal 10 incorporates an inner ring (ring) 11 fixed on the outer circumference of the crank shaft 2, an outer ring 12 fixed on the inner circumference of the housing 5, a first seal 20 fixed on the outer ring 12 for sealing the engine 1 side and a second seal 30 for sealing the flywheel 4 side.

The inner ring 11 includes a cylinder 13 fitted on the outer circumference of the crank shaft 2 and a ring-shaped flange 14 formed from an end of the cylinder 13 and projected outward in a radial direction of the crank shaft 2, the flange 14 having a L-shaped cross section. The inner ring 11 is made of metals or other material with high stiffness. The flange 14 is arranged on the end of the cylinder 13, the end being closer to the engine 1.

The outer ring 12 is made of metal or other material with high stiffness. The outer ring 12 is circularly provided on the outer circumferential side of the inner ring 11, and includes an approximately cylindrical fixing part 15 fitted on the inner circumference of the housing 5 and a projection 16 continuously formed from the end of the fixing part 15 and projected to the inner circumferential side from the fixing part 15. The projection 16 is curved so that the tip end thereof is arranged at the approximate center of the dimension in the axial direction of the cylinder 13 when the fixing part 15 of the outer ring 12 and the cylinder 13 of the inner ring 11 are provided with being opposite to each other. Further, the cylinder 13 of the inner ring 11 and the fixing part 15 of the outer ring 12 are formed so that the respective dimensions in the axial direction are substantially same. Therefore, the dimension of the oil seal 10 in the axial direction is substantially same as that of the inner ring 11 and the outer ring 12.

Figure 3:
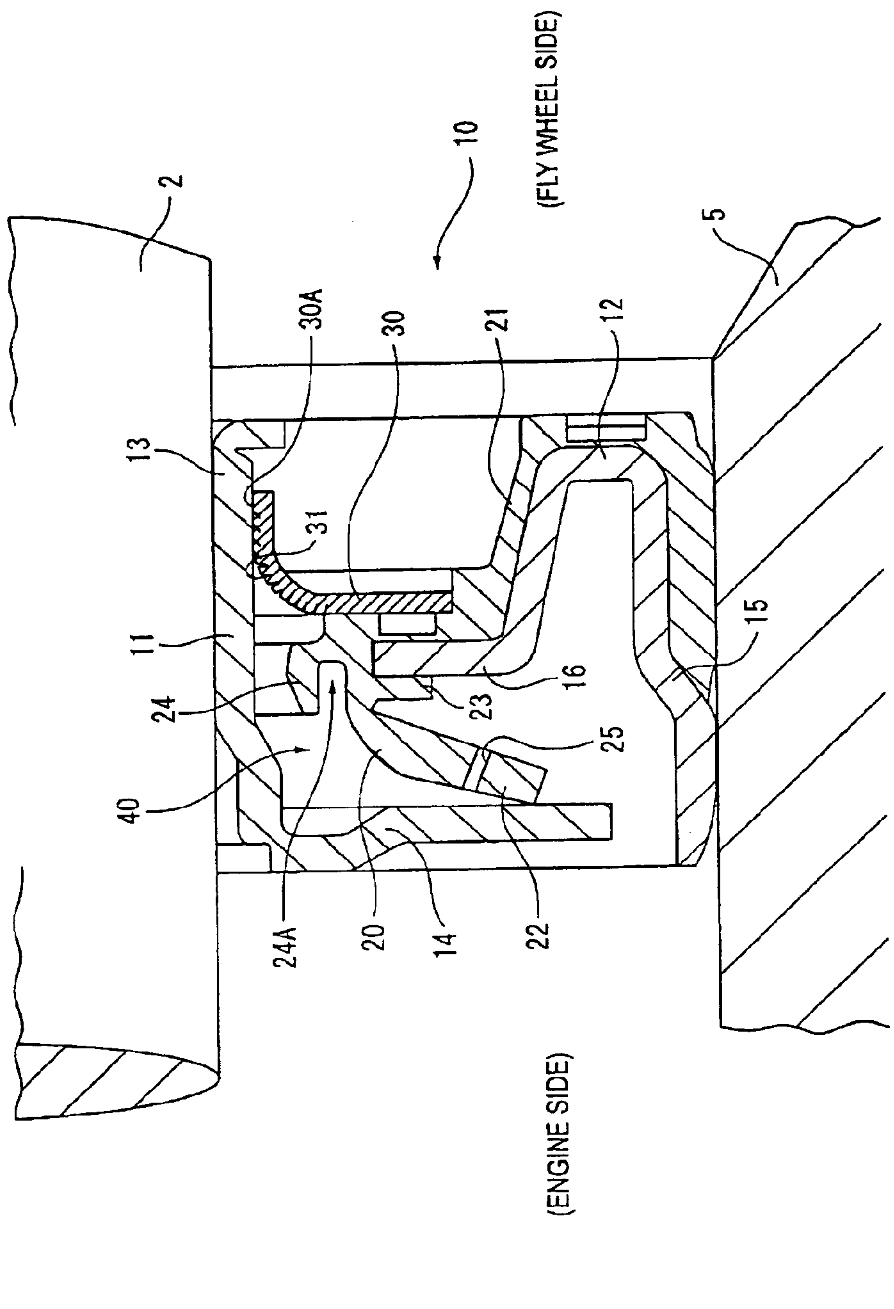
FIG. 3 is a partly enlarged drawing of the oil seal according to the embodiment of the present invention.

The first seal 20 is made of a silicone rubber, a fluorocarbon rubber, a fluorocarbon resin or any other materials. As shown in a partly enlarged drawing of FIG. 3, the first seal 20 includes a fixing part 21 arranged along the outer ring 12 and a first seal lip 22 and integrally formed with the fixing part 21 and abutted on the flange 14 of the inner ring 11 from the flywheel 4 side.

The fixing part 21 is fixed so as to cover the outer circumference of the fixing part 15 of the outer ring 12 and the surface on the flywheel 4 side of the projection 16 by way of adhesive etc. In the fixing part 21, the part covering the outer circumference of the fixing part 15 of the outer ring 12 is sandwiched between the fixing part 15 and the inner circumference of the housing 5. Further, in the fixing part 21, a flange-shaped junction 23 is integrally formed with the fixing part 21 at its part bonded to the end of the projection 16 so as to surround toward the opposite surface of the projection 16, and bonded to the opposite surface remote from the surface where the fixing part 21 of the projection 16 is bonded. Since the junction 23 and the end of the fixing part 21 are bonded so as to sandwich the end of the projection 16 therebetween, the first seal 20 is stably fixed on the outer ring 12.

The first seal lip 22 is integrally formed with the junction 23 and the fixing part 21 in a disk shape with its diameter being enlarged toward the outer circumferential side from the end of the inner circumferential side of the fixing part 21. The tip end side of the first seal lip 22 is abutted on the surface of the flange 14 in the flywheel 4 side from the direction substantially along the axial direction of the crank shaft 2 so as to be an axial seal. The base end of the first seal lip 22 is thinner than other parts. Therefore, the thinner part secures sufficient flexibility of the first seal lip 22. Accordingly, the first seal lip 22 secures the long-lasting sealability against the flange 14, since the first seal lip 22 is pressurized to be abutted on the flange 14 with an appropriate biasing force.

A projection 24, the cross section of which is hook shape, is integrally formed on the base end side of the first seal lip 22. The projection 24 is extended from the inner circumference of the base end side of the first seal lip 22 in substantially parallel to the axial direction of the crank shaft 2 with a predefined distance. A space 24A, the cross section of which is squared U shape, is formed between the outer circumference of the projection 24 and the inner circumference of the first seal lip 22. The space 24A blocks the engine oil having entered into the space 24A over the first seal lip 22 to prevent the engine oil from shifting to the second seal 30 side.

The second seal 30 is made of plate-shaped Polytetrafluoroethylene (PTFE) in a ring shape. The base end of the second seal 30, i.e., the outer circumferential side of the ring is bonded to the fixing part 21 of the first seal 20 by vulcanizing adhesion etc. An abutment 30A provided at the tip end of the second seal 30, i.e., the inner circumferential side of the ring is curved toward the flywheel 4 side, so that the one side of the abutment 30A is abutted on the cylinder 13 of the inner ring 11 from the direction substantially along the radial direction of the crank shaft 2 over a predetermined area. At this time, the second seal 30 secures the long-lasting sealability against the inner ring 11, since the second seal 30 is curved at its tip end side to be pressurized toward the inner ring 11 with an appropriate biasing force. Namely, the second seal 30 is a radial seal abutted on the crank shaft 2 from the radial direction in order to seal the lubrication oil of the flywheel 4 side.

A spiral groove 31 is formed on the abutment 30A of the second seal 30 by cutting from the base end side of the second seal 30 to its tip end side.

Thus, a portion which is surrounded by the first seal 20, the second seal 30 and the inner ring 11 can be obtained since the first seal 20 and the second seal 30 respectively seal the flange 14 and the cylinder 13, so as to define a space 40 which is sealed and isolated from both the engine 1 side and the flywheel 4 side.

The first seal 20 is formed at its tip end with a circular communication hole 25 arranged directly below the center of the axis of the crank shaft 2 in the gravitation direction in order to communicate between the inside and the outside of the space 40 by piercing through the first seal 20 in the direction of its thickness.

When the engine 1 having the above-mentioned configuration is started, the pistons 3 are reciprocated by combustion gas, and accordingly, the crank shaft 2 is rotated. The inner ring 11 of the oil seal 10 rotates with the crank shaft 2, and the flange 14 spatters almost all of the engine oil adhered on the engine 1 side by the centrifugal force. Further, since the flange 14 seals the engine oil of the engine 1 side by sliding on the first seal 20, the first seal 20 seals the engine oil even when the engine oil having entered over the flange 14. When a minute amount of the engine oil is further entered through the gap between the first seal 20 and the flange 14, the engine oil is blocked by the space 24A by falling down the first seal 20, shifted lower side in the gravitation direction by falling down inside the space 24A, shifted to the abutment abutted on the flange 14 by falling down the first seal 20 again, and then discharged from the gap between the first seal 20 and the flange 14.

On the other hand, in the flywheel 4 side, the cylinder 13 seals the lubrication oil of the flywheel 4 side by sliding on the second seal 30. When the lubrication oil is entered into the gap between the second seal 30 and the cylinder 13, the lubrication oil is forced to be pushed out along the spiral groove 31 with its rotation, and accordingly, discharged to the outside of the second seal 30.

In general use, since the lubrication oil is not always adhered to the gap between the first seal 20 and the flange 14 or between the second seal 30 and the cylinder 13, air can be appropriately sucked from both gap. However, in excessively lubricated condition, for example, that the first seal 20 and the second seal 30 are often exposed to the lubrication oil and the engine oil, the engine oil always presents at the gap between the first seal 20 and the flange 14, and the lubrication oil is always presents at the gap between the second seal 30 and the cylinder 13. In such case, the engine oil and the lubrication oil are continuously discharged from the space surrounded by the first seal 20, the second seal 30 and the inner ring 11, thus the air in the space 40 becomes less. On the other hand, the space surrounded by the first seal 20, the second seal 30 and the inner ring 11 is filled with the lubrication oil, thereby the air is inhibited from flowing into the space 40. The oil seal 10 induces the outside air through the communication hole 25 so as to eliminate the negative pressure in the space 40.

When the communication hole 25 sucks the engine oil together with the air, the engine oil shifts to the tip end side (bottom end side in the gravitation direction) of the first seal 20 arranged directly below the communication hole 25, and discharged from the gap between the first seal 20 and the flange 14.

With such embodiment, following advantages can be obtained.

(1) Since the first seal 20 is abutted on the flange 14 from the direction substantially along the axial direction of the crank shaft 2, so as to be an axial seal, the surface pressure of the abutment can be reduced compared to the case of a radial seal abutted from the radial direction of the crank shaft 2. Therefore, the wear-resistance and the durability of the first seal 20 can be improved while securing its long-lasting sealability, thereby realizing the longer life of the oil seal 10.

(2) Since the second seal 30 is formed in a plate shape, the tip end thereof can be preferably curved and closely contact to the cylinder 13 in a reliable and preferable manner. With such arrangement, the sealability of the second seal 30 can be improved.

Since the second seal 30 is made of Polytetrafluoroethylene, the abrasion of the second seal 30 can be preferably prevented for a long time due to its characteristics of the excellent heat-resistance and the low friction coefficient. Further, due to the low-temperature resistance of the second seal 30, the second seal 30 can reduce its change in the material characteristics even when the engine 1 is used at a place with low-temperature so as to secure flexibility of the second seal 30, thereby realizing the long-lasting sealability and the durability. Further, according to unabsorbent characteristic of the second seal 30, the second seal 30 would not absorb the lubrication oil even after using for a long time, thereby maintaining the long-lasting sealability.

(3) Since the first seal 20 is provided with the communication hole 25, the air can be sucked into the space 40 from the communication hole 25 even when the engine oil and the lubrication oil are always filled to the surface where the inner ring 11 slides, thereby preventing the occurrence of the negative pressure in the space 40. Accordingly, even under the condition that the oil seal 10 is often exposed to the lubrication oil and the engine oil, the occurrence of the negative pressure in the space 40 is prevented, thereby preferably preventing the oil seal 10 from the extraordinary abrasion and the deterioration due to heating, and improving the durability of the oil seal 10.

(4) Since the first seal 20 is formed with the communication hole 25 directly below the center of the rotation of the crank shaft 2 in the gravitation direction, the engine oil is collected at the bottom end of the first seal 20 directly arranged below the communication hole 25 by falling down the inside of the first seal 20 to be sequentially discharged, even when the engine oil is sucked through the communication hole 25. In other words, since the communication hole 25 is arranged around the bottom end of the first seal 20, the sifting distance of the engine oil falling down the inside of the first seal 20 can be reduced, the adhering amount of the engine oil to the first seal 20 can be restricted, and the engine oil can be reliably discharged.

(5) In the oil seal 10, since the first seal 20 is an axial seal and the second seal 30 applies the radial seal made of PTFE, the first seal 20 can seal the engine oil and the second seal 30 can seal the lubricating oil in a preferable and reliable manner even when the oil seal 10 is provided between the crank shaft 2 and the flywheel 4 of the engine 1 with the fast-rotation under a excessively lubricated condition.

Further, since the first seal 20 is arranged on the engine 1 side in an excessively lubricated condition, the flange 14 of the inner ring 11 can eliminate almost all of the engine oil adhered on the oil seal 10 by the centrifugal force. Further, the first seal 20 seals the engine oil having entered over the flange 14, thereby securing the sealability in addition to the durability of the axial seal. On the other hand, the second seal 30 of the flywheel 4 side is hardly subject to the spattering of the lubrication oil around the oil seal 10, however, the second seal 30 is made of PTFE that enables to slide on the cylinder 13 even when there is few amount of the lubrication oil between the second seal 30 and the cylinder 13, thereby securing the sufficient durability.

(6) Since the second seal 30 is formed with the spiral groove 31, the position of the groove 31 continuously shift from the base end side to the tip end side of the second seal 30 relative to the constant position of the cylinder 13 while the groove 31 sliding on the cylinder 13. Accordingly, when the lubrication oil having entered into the gap between the second seal 30 and the cylinder 13, the lubrication oil shifts from the base end side to the tip end side of the second seal 30 upon the shift of the groove 31, thereby discharging the lubrication oil to the outside of the second seal 30.

(7) Since the lubrication oil is sealed when the second seal 30 is abutted on the cylinder 13 of the inner ring 11 to slide on the cylinder 13, the crank shaft 2 can be prevented from wearing compared to the case that the second seal 30 is directly abutted on the crank shaft 2. Accordingly, when the oil seal 10 is replaced due to the abrasion of the second seal 30, only the oil seal 10 is required to be replaced since the crank shaft 2 is not worn, thereby simplifying its maintenance procedure and reducing its maintenance cost.

It is noted that the present invention should not be restricted to the embodiment as stated above, and accordingly, the present invention should include various variant forms, modifications and the like thereof with the scope which can achieve the object of the present invention.

The material of the second seal is not limited to the PTFE. For example, material can be appropriately selected from fluorocarbon resin such as Tetrafluoroethylene-Perfluoroalkylvinylether Copolymer (PFA), Tetrafluoroethylene-Hexafluoropropylene Copolymer (FEP), Ethylene-Tetrafluoroethylene Copolymer (ETFE) or the like by taking the use application of the oil seal and its use condition etc. into considerations.

Further, the second seal may not be formed in a plate shape. For example, the second seal may have a block shape provided with a hole having the same diameter as the rotary shaft to seal the rotary shaft by penetrating the rotary shaft through the hole. The second seal may be appropriately formed in any shape so as to seal the rotary shaft.

The second seal may not abut on the inner ring at its tip end. For example, the second seal may be directly abutted on the rotary shaft from the radial direction. With such configuration, the second seal can seal the rotary shaft from the radial direction, thereby achieving the object of the present invention. In such case, the space 40 surrounded by the first seal, the second seal and the ring partly includes the outer circumference of the rotary shaft.

Though the second seal formed in a ring-like plate is curved in the axial direction of the rotary shaft so as to abut on the rotary shaft, the present invention is not limited to this configuration. The second seal may be provided with a curved part or a bent part in order to abut on the rotary shaft or the ring from the radial direction. In such case, the second seal is only required to abut substantially from the radial direction of the rotary shaft. The second seal may not be disposed perpendicular to the rotary shaft at its base end. Further, the groove formed on the second seal may not be provided. As described above, the second seal can be formed in any shape by taking the use condition and the use material etc. into considerations.

The first seal can be provided separately from the fixing part bonded to the ring, and the projection may not be provided for sealing a minute amount of liquid. Namely, the first seal may be also formed in any shape by taking the use condition etc. into considerations.

The flange may not project outward in the radial direction of the rotary shaft, and may have angles in some measure. The first seal may not abut on the flange along the axial direction, and may abut thereon with angles in some measure. Namely, the first seal is only required to abut on the flange substantially along the axial direction.

Though the first and the second liquid are respectively the engine oil and the lubrication oil, and the two kinds of liquid have substantially same components, one liquid may be different from the other one.

Though one communication hole is formed on the first seal, a plurality of communication holes may be formed. The shape thereof may not be circle, and may be formed in any shape such as a triangle one or an elongated hole, with its desirable dimensions. Further, the communication hole may not be formed on the first seal, and may be formed on the second seal. Alternatively, two communication holes may be provided on both of the first and the second seals. Namely, at least one communication hole is only required to be formed on the first seal and/or the second seal.

Though the position of the communication hole is arranged directly below the center of the rotary shaft, the present invention is not limited to this configuration. If the communication hole is formed on the lower side relative to the center of the rotary shaft in the gravitation direction, the distance between the communication hole and the bottom end of the first seal in the gravitation direction becomes short, thereby restraining the liquid from falling down the inside of the first seal at the minimum, and also restricting that the liquid adheres on the inside of the first seal at the minimum. Note that, the position of the communication hole may not be the lower side but may be the upper side of the center of the rotary shaft in the gravitation direction. In such case, the possibility of closing the communication hole is reduced when the liquid is collected at the bottom end of the first seal, thereby reliably preventing the occurrence of the negative pressure in the space inside the first seal, and preferably avoiding the extraordinary abrasion of the second seal.

The communication hole may not be formed. Specifically, when the present invention is used in a lightly lubricated condition where the negative pressure is not occurred inside the space, two kinds of the liquid can be preferably sealed without forming the communication hole, thereby achieving the object of the present invention.

Further, without limiting to the communication hole, a groove may be formed so as to communicate between the inside and the outside of the space. Means for preventing the occurrence of the negative pressure is only required to be provided in order to eliminate the negative pressure inside the space by communicating between the inside and the outside of the space while securing the sealability.

The oil seal may not be arranged between the crank shaft and the flywheel in the engine area For example, the oil seal may be arranged at a cam shaft of an engine front or at a transmission rear. Further, the oil seal is not limited to be provided at the engine, and may be applied to a farm equipment, a railcar or any other equipments to be used for a shaft bearing with rotary movement.

The most preferable structure and method etc. for implementing the present invention are disclosed in the above description, however, the present invention is not limited thereto. Specifically, while the specific embodiment of the present invention has been shown and described herein, it will be understood that various changes in the form, material, quantity and details of the embodiment described may be made by those skilled in the art without departing from the spirit and scope of the present invention.

Accordingly, since the present invention is not limited to the above disclosed form, material or the like but they are described as examples for easy understanding, includes a description with names of components excluding a part or all of the limitation on the form and material etc.

What is claimed is:

1. An oil seal for being provided on an outer circumference of a rotary shaft for sealing a first liquid and a second liquid, said oil seal comprising:

a ring which is fixed on the outer circumference of the rotary shaft and which includes a flange projecting outward from the rotary shaft substantially along a radial direction of the rotary shaft;

a first seal which includes at least a first portion which is bent with respect to an axial direction of the rotary shaft to abut against the flange so as to seal a side on which the first liquid is provided;

a second seal which includes at least a first portion which is bent with respect to the radial direction of the rotary shaft to seal a side on which the second liquid is provided; and at least one communication hole in at least one of the first seal and the second seal, said at least one communication hole communicating between an inside and an outside of a space surrounded by the first seal, the second seal and the ring.

2. The oil seal according to claim 1, wherein the second seal is made of fluorocarbon resin.

3. The oil seal according to claim 2, wherein the second seal is plate-shaped, and the fluorocarbon resin is Polytetrafluoroethylene.

4. The oil seal according to claim 1, wherein the first seal is made of fluorocarbon resin.

5. The oil seal according to claim 1, wherein said at least one communication hole is formed in a lower side of the oil seal in a gravitation direction relative to a center of the rotary shaft.

6. The oil seal according to claim 2, wherein said at least one communication hole is formed in a lower side of the oil seal in a gravitation direction relative to a center of the rotary shaft.

7. The oil seal according to claim 3, wherein said at least one communication hole is formed in a lower side of the oil seal in a gravitation direction relative to a center of the rotary shaft.

8. The oil seal according to claim 4, wherein said at least one communication hole is formed in a lower side of the oil seal in a gravitation direction relative to a center of the rotary shaft.

9. The oil, seal according to claim 1, wherein:

the rotary shaft comprises a crank shaft;

the side on which the first liquid is provided is a side of an engine to which the crank shaft is connected; and the side on which the second liquid is provided is a side of a flywheel attached to the crank shaft.

10. The oil seal according to claim 2, wherein:

the rotary shaft comprises a crank shaft;

the side on which the first liquid is provided is a side of an engine to which the crank shaft is connected; and the side on which the second liquid is provided is a side of a flywheel attached to the crank shaft.

11. The oil seal according to claim 3, wherein:

the rotary shaft comprises a crank shaft;

the side on which the first liquid is provided is a side of an engine to which the crank shaft is connected; and the side on which the second liquid is provided is a side of a flywheel attached to the crank shaft.

12. The oil seal according to claim 4, wherein:

the rotary shaft comprises a crank shaft;

the side on which the first liquid is provided is a side of an engine to which the crank shaft is connected; and the side on which the second liquid is provided is a side of a flywheel attached to the crank shaft.

13. The oil seal according to claim 5, wherein:

the rotary shaft comprises a crank shaft;

the side on which the first liquid is provided is a side of an engine to which the crank shaft is connected; and the side on which the second liquid is provided is a side of a flywheel attached to the crank shaft.

14. The oil seal according to claim 6, wherein:

the rotary shaft comprises a crank shaft;

the side on which the first liquid is provided is a side of an engine to which the crank shaft is connected; and the side on which the second liquid is provided is a side of a flywheel attached to the crank shaft.

15. The oil seal according to claim 7, wherein:

the rotary shaft comprises a crank shaft;

the side on which the first liquid is provided is a side of an engine to which the crank shaft is connected; and the side on which the second liquid is provided is a side of a flywheel attached to the crank shaft.

16. The oil seal according to claim 8, wherein:

the rotary shaft comprises a crank shaft;

the side on which the first liquid is provided is a side of an engine to which the crank shaft is connected; and the side on which the second liquid is provided is a side of a flywheel attached to the crank shaft.

* * * * *